(12) United States Patent
Barsotti et al.

(10) Patent No.: US 7,303,797 B1
(45) Date of Patent: Dec. 4, 2007

(54) GAS BARRIER COATING SYSTEM FOR POLYMERIC FILMS AND RIGID CONTAINERS

(75) Inventors: Robert J. Barsotti, Franklinville, NJ (US); Derek John Winter, North Yorkshire (GB)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/482,724

(22) Filed: Jan. 13, 2000

Related U.S. Application Data

(63) Continuation-in-part of application No. 09/251,082, filed on Feb. 16, 1999, now abandoned.

(51) Int. Cl.
*B29D 22/00* (2006.01)
*B29D 23/00* (2006.01)
*B32B 1/08* (2006.01)

(52) U.S. Cl. .................. 428/36.7; 428/35.7; 428/36.6; 428/323; 428/325

(58) Field of Classification Search ............... 428/35.7, 428/36.6, 36.7, 323, 325, 328, 331, 410, 428/913, 500, 512, 336, 446, 501, 502, 519, 428/527, 524

See application file for complete search history.

(56) References Cited

U.S. PATENT DOCUMENTS

| | | | | |
|---|---|---|---|---|
| 5,234,761 A | * | 8/1993 | Barnes et al. | 428/336 |
| 5,429,867 A | | 7/1995 | McCarthy et al. | 428/331 |
| 5,571,614 A | | 11/1996 | Harrison et al. | 428/331 |
| 5,700,560 A | | 12/1997 | Kotani et al. | 428/325 |
| 5,766,751 A | * | 6/1998 | Kotani et al. | 428/323 |

FOREIGN PATENT DOCUMENTS

| | | |
|---|---|---|
| EP | 0 590 263 A2 | 6/1994 |
| EP | 0 498 569 B1 | 6/1995 |
| EP | 0 805 177 A2 | 11/1997 |
| GB | 2 303 374 | 2/1997 |
| WO | WO 98/56861 | 12/1998 |

* cited by examiner

*Primary Examiner*—Michael Miggins

(57) ABSTRACT

A water-borne gas barrier coating composition for polymeric films and shaped containers, including a two-layer coating system with a laminar layer mineral in the gas barrier layer, which is particularly well suit for spray application to biaxially oriented injection stretch blow molded PET bottles for carbonated beverages and beer.

7 Claims, No Drawings

GAS BARRIER COATING SYSTEM FOR POLYMERIC FILMS AND RIGID CONTAINERS

This application is a continuation-in-part of application Ser. No. 09/251,082, filed Feb. 16, 1999, which is now abandoned.

BACKGROUND OF THE INVENTION

The present invention relates to an improved water-borne gas barrier coating composition for polymeric films and rigid, i.e., shaped, containers, and, more particularly, to an improved two-layer coating system which includes a laminar layer mineral in the gas barrier layer and is particularly well suit for spray application. The invention further relates to coated polymeric substrates which exhibit substantially increased gas barrier performance over un-coated polymeric substrates as well as over those which have been coated with any other known gas barrier system.

U.S. Pat. No. 5,700,560 describes a resin composition, and films coated therewith, consisting of a high-hydrogen bonding resin, such as polyvinyl alcohol, and a non-film-forming inorganic laminar compound which provides improved gas barrier properties of the resulting film by increasing the aspect ratio of the inorganic laminar compound.

U.S. Pat. No. 5,571,614 describes a coated polymeric film in which a coating layer is formed from a composition comprising a layer mineral and a cross-linking agent. The coated film additionally comprises a primer layer formed from a copolymer of ethylene with a vinyl monomer which is applied to the film substrate prior to coating with the layer mineral coating.

There is a need for a reliable, economical and environmentally acceptable, i.e., recyclable, coating system for injection stretch blow molded PET bottles, in particular, which will dramatically improve barrier performance such that the bottles can be used for carbonated soft drinks and beer in 12 oz. (33 ml) sizes.

SUMMARY OF THE INVENTION

The present invention resides in the discovery that it is possible to substantially increase, e.g., up to 20 or even 30 times or more, the gas barrier performance of conventional rigid, i.e., shaped or molded, plastic containers and films by applying to at least one surface of the container or the film a unique water-borne composition to form a first coating layer. The water-borne composition comprises a water-soluble or water dispersible organic binder, in the optional presence of a cross-linking agent, wherein the organic binder includes from 10% up to less than 90% by weight, based on the dry weight of the first coating layer, of an inorganic laminar mineral selected from montmorillonite, laponite, organo-modified montmorillonite and mixtures thereof. The first coating layer can be uncross-linked, partially cross-linked or fully cross-linked.

Spray application of the coating composition produces a generally uniform first coating layer having a dry thickness of up to 20 microns, although in practice excellent barrier properties have been observed with relatively thin coating layers in the range of only 3 to 4 microns in thickness. The mineral platelets become oriented within the organic binder portion of the dry coating layer in a generally parallel three-dimensional and overlapping spaced relationship. Depending on the application, a shaped plastic container having a first coating layer for gas barrier properties, for example, can also include a second substantially clear coating layer adhered to the first coating layer. The second coating layer comprises a curable composition comprising (a) a binder component in (b) an organic solvent.

Thus, according to one aspect, the present invention is a polymeric container for foods and beverages which comprises:

(A) a polymeric substrate shaped to define a container for a food or beverage;
(B) a first coating layer adhered to at least one surface of the polymeric substrate and capable of retarding the transmission of oxygen and carbon dioxide through the substrate, said first coating laying comprising a water-soluble or water-dispersible organic binder and from 10% up to less than 90% by weight, based on the dry weight of the first coating layer, of an inorganic laminar mineral selected from montmorillonite, laponite, organo-modified montmorillonite and mixtures thereof. Most conventional rigid or shaped polymeric containers which have a first coating layer on at least one surface thereof according to the invention will exhibit, based on test samples cut from bottle walls, an Oxygen Permeability Value of about 0.7 cc mil/100 in$^2$/day/atm, although the Oxygen Permeability Value can be as low as 0.07 cc mil/100 in$^2$/day/atm. In some cases Oxygen Permeability Values lower than 0.03 cc mil/100 in$^2$/day/atm have been observed for wall and/or film test samples. Total bottle permeability (as measured in cc/pack/day on a Mocon Oxtran 2/60 or 2/20 instrument) will exhibit an improvement in Oxygen Permeability Value of up to 35 times vs. uncoated control bottles. However, absolute barrier performance for whole bottles (vs. discreet test samples from bottle side walls) will depend on such factors as coating uniformity and thickness, percentage of total bottle surface area covered, optimum orientation of the laminar mineral within the coating layer, container imperfections, if any, which can result from the blow molding process, and the like.

The container optionally includes a second clear coat layer (C) adhered to the first coating layer which comprises a curable composition comprising (a) a binder component in (b) an organic solvent.

According to another aspect, the invention is a method for packaging a carbonated liquid, i.e., a beverage, in a molded biaxially oriented rigid polyester container which comprises:

(1) forming the container;
(2) applying to at least one surface of the container a first coating layer having a thickness in the range of 8 microns or less by spraying onto the container an aqueous composition comprising (a) an organic binder, which is a water soluble or water-dispersible organic binder, in the optional presence of a cross-linking agent, and (b) from 10% up to less than 90% by weight, based on the dry weight of the first coating layer, of an inorganic laminar mineral selected from montmorillonite, laponite, organo-modified montmorillonite and mixtures thereof;
(3) drying the first coating layer at ambient or slightly elevated temperature, and optionally curing it at a temperature below the temperature at which heat distortion of the container can occur;
(4) applying to the first coating layer a second coating layer having a thickness in the range of about 12 microns or less by spraying onto said first coating layer a curable composition comprising (a) a binder component and (b) an organic solvent;
(5) curing the second coating layer;
(6) introducing a carbonated liquid into the container; and
(7) sealing the container.

According to yet another aspect, the present invention is a method for reducing the oxygen and carbon dioxide permeability of a polyester substrate, which is a film or a side-wall or bottom portion of a shaped or molded container, which comprises spraying onto at least one surface of the substrate a generally uniform aqueous coating composition to form a first coating layer which adheres to the substrate. The aqueous composition comprises a water-soluble or water dispersible organic binder, in the optional presence of a cross-linking agent, and from 10% up to less than 90% by weight, based on the dry weight of the coating layer, of an inorganic laminar mineral selected from montmorillonite, laponite, organo-modified montmorillonite and mixtures thereof. The laminar mineral comprises platelets, and the platelets move within the aqueous composition as it is sprayed onto the substrate to orient themselves in a generally parallel three-dimensional and overlapping spaced relationship within the first coating layer. According to one embodiment, the method includes (after drying and optionally curing the first coating layer as described above) the additional steps of (1) applying to the first coating layer a second coating layer having a thickness in the range of about 12 microns or less by spraying onto said first coating layer a curable composition comprising (a) a binder component and (b) an organic solvent, and (2) curing the second coating layer.

The invention according to another aspect is a waterborne gas barrier coating composition particularly well-suited for spray application onto polymeric substrates. The coating composition contains at least 2% by wt. solids wherein the solids portion of the composition comprises:
(a) from greater than 10% to less than 90% by wt. of a film-forming water-dispersible or water-soluble organic binder;
(b) from less than 90% to greater than 10% by wt. of an inorganic laminar mineral in the form of platelets selected from montmorillonite, laponite, organo-modified montmorillonite and mixtures thereof; and, optionally,
(c) from 5% by wt. to 95% by wt., based on the weight of the organic binder, of a cross-linking agent.

The invention is particularly well suited for improving the gas barrier performance of poly(ethylene terephthalate) films and rigid containers used for packaging foods and beverages, and especially injection stretch blow molded PET bottles used for packaging carbonated soft drinks and beer.

DETAILED DESCRIPTION

The invention is a unique coating system for polymeric films and rigid, i.e., shaped or molded, containers produced from conventional polymeric materials and comprises a first, optionally cross-linked, coating layer based on a water-borne composition and an optional second substantially clear coating layer based on a two-component solvent/binder composition. A preferred embodiment of the invention embraces the dual coating layer system applied to either a polymeric film or the exterior surface of a rigid container, particularly an injection stretch blow molded biaxially oriented polyester container, to achieve substantially increased resistance to permeation by oxygen and carbon dioxide, e.g., up to 20 to 30 times or more resistance to permeation vs. a polymeric film or container without the coating system. The coating compositions, moreover, can be applied economically to films or containers by any convenient spray application method. Polymeric films and containers having the first barrier coating layer typically exhibit for a given polymeric film thickness, based on test samples cut from container sidewalls, an Oxygen Permeability Value in the range of about 0.7 cc mil/100 in$^2$/day/atm or less, which is one means for determining and comparing gas barrier performance. In some applications, the Oxygen Permeability Value can be as low as 0.07 cc mil/100 in$^2$/day/atm, and even lower, e.g., in the range of 0.03 cc mil/100 in$^2$/day/atm. The substantially clear overcoat operates to protect the first barrier coating layer from deterioration, degradation, etc. during use.

An important feature derived from the invention is that the coating system does not interfere with the ability to recycle coated films or plastic containers. The first coating layer, which is the gas barrier layer, is water soluble and relatively easy to remove. For containers and films having the two-layer system, the coating system can be removed by scoring the outer clear coat layer to allow water or other solvent to penetrate and dissolve the coating system.

Polymeric Substrate

The gas barrier coating system of the invention can be applied to practically any thermoplastic polymeric surface. Films and rigid containers contemplated for use according to the invention include those formed from conventional thermoplastic polymers, such as polyolefins, polyamides, and engineering polymers, such as polycarbonates, and the like. The invention is particularly applicable to films and rigid, i.e., shaped, containers, and especially injection stretch blow molded biaxially oriented hollow thermoplastic containers, such as bottles, formed from synthetic linear polyesters, such as polyethylene terephthalate, polybutylene terephthalate, polyethylene naphthalate, and the like, including homopolymers and copolymers of ethylene terephthalate and ethylene naphthalate wherein up to about 50 mole percent or more of the copolymer can be prepared from the monomer units of diethylene glycol; propane-1,3-diol; butane-1,4-diol; polytetramethylene glycol; polyethylene glycol; polypropylene glycol and 1,4-hydroxymethylcyclohexane substituted for the glycol moiety in the preparation of the copolymer; or isophthalic, dibenzoic; naphthalene 1,4- or 2,6-dicarboxylic; adipic; sebacic; and decane-1,10-dicarboxylic acid substituted for the acid moiety in the preparation of the copolymer. The foregoing description is intended to be an illustration of applicable polymeric substrates and not by way of a limitation on the scope of the invention.

First Coating Layer

The first coating layer, i.e., the gas barrier coating layer, is formed from a water-borne composition which contains at least 2% by weight solids. Water is the primary carrier or solvent for the solids component of the barrier composition, although the composition may optionally contain a small amount, e.g., not more than about 10% by wt. based on the total amount of solvent, of a suitable co-solvent. The solids portion of the water-borne barrier composition contains generally from 10% up to less than 90% by wt., based on the weight of the first coating layer after drying/curing, of an inorganic laminar mineral selected from phyllosilicates, and particularly montmorillonite, laponite, organo-modified montmorillonite and mixtures thereof. "Organo-modified montmorillonite" is used herein to describe a clay material whereby an organic moiety has been strongly attached to the clay platelet by a treatment of subjecting the clay to an ion exchange process whereby interlammelar inorganic cations present in the clay are replaced by organic cations comprising, but not limited to, either an organic group bonded to a cationic salt group, such as quaternary ammonium, phosphonium, pyridinium, or the like, or an organic compound containing a cationic amine salt group.

The laminar minerals are available commercially and comprise platelets which can have a thickness of from 10 to 60 Angstroms and an aspect ratio, i.e., the ratio of the maximum width of a platelet to its thickness, of typically greater than 150. More detailed information on the composition and structure of phyllosillicate layer minerals can be found in "Clay Minerals: Their Structure, Behaviour & Use", Proceedings of a Royal Society Discussion Meeting, 9 and 10 Nov. 1983, London, The Royal Society, 1984.

Commercially available montmorillonite platelets will have length and width dimensions which can both range from 150 to 250 nm, and commercially available laponite platelets will have length and width dimensions which can both range from 2 to 20 nm up to 20 to 200 nm. Platelet thickness will generally be in the range of 1 nm. Laminar minerals having lower levels of impurities, such as, for example, quartz, silica, mica, etc., are preferred over other commercial grades of laminar minerals for their improved barrier performance in use.

The solids portion of the water-borne barrier composition will also include from greater than 10% by wt. to less than 90% by wt. of a water-soluble or water-dispersible film-forming organic binder selected from the group consisting of:

(a) homopolyesters; copolyesters, particularly core/shell type copolyesters where the "core" is a copolyester of number average molecular weight around 12,000-25,000, and the "shell" is a modified (e.g., acrylic modified) hydrophilic polymer layer; and copolyesters derived from a sulpho derivative of a carboxylic acid selected from sulphoterephthalic acid and sulphoisophthalic acid;
(b) linear or branched acrylic resins having a weight average molecular weight of at least 3000;
(c) copolymers of acrylic acid, methacrylic acid and their lower alkyl esters;
(d) polyolefins, particularly of a functionalized nature, such as maleinised polybutadiene;
(e) polysaccharides including cellulosic materials selected from cellulose, hydroxymethyl cellulose, carboxymethyl cellulose, amylose, pluran, starch, hydroxyethyl cellulose, and the like which are synthesized by condensation polymerization of monosaccharides;
(f) polyvinyl alcohol;
(g) water based aliphatic or aromatic urethanes;
(h) ethylene-vinyl alcohol copolymer (EVOH), polyvinylidene dichloride (PVDC), polyacrylonitrile (PAN) and polyethylenimine, where the polyethyleneimine polymers are of number average molecular weight of from 3000 to 100,000 and can be used alone or in conjunction with polyvinyl alcohol, polyvinyl lactam, polyvinyl pyrrolidone, and the like;
(i) melamine formaldehyde resin;
(j) acrylic latices;
(k) polyvinyl acetate latices;
(l) polyethylene glycol; and
(m) blends thereof.

The water soluble or water dispersible organic binder described above optionally contains (1) a catalyst selected from sulfonic acids, amines, and tin catalysts and, also at the option of the user, (2) at least one cross-linking agent selected from melamine formaldehyde resin, epoxy resins, isocyanates, aziridenes, carbodiimides, urea formaldehydes, phenolics, silanols, and acids.

Water Soluble or Water Dispersible Organic Binder

The copolyesters listed above in connection with the water dispersible organic binder component are the same type of polyesters suitable for use with the hydroxyl binder in the clear coating layer and described in greater detail below. They are characterized by exhibiting a final acid number of 15 or higher with the acid being neutralized by an amine, such as dimethanol amine, aminomethyl propanol, and the like.

With respect to acrylic resins listed above, the term "linear or branched acrylic resins having a weight average molecular weight of at least 3000" includes those resins which can have functional groups (e.g., acid, amine, hydroxyl or epoxy) on the backbone, in the graft or on both backbone and graft. Also with respect to water-soluble or water-dispersible organic binders selected from linear or branched acrylic resins, the binder may comprise, in its overall concept, one type of water-soluble or water-dispersible graft acrylic copolymer which is formed by free-radical initiated co-polymerization of 5-95% by wt. alpha-beta unsaturated monomers in the presence of 95-5% by wt. of an acrylic macromonomer. The acrylic macromonomer is anionic in character with a preferred number average molecular weight (MN) of between 500 to 20,000, and it contains less than about 1% of an acid functional alpha-beta unsaturated monomer, so that the backbone remains relatively hydrophilic and the macromonomer side chains remain relatively hydrophobic, following at least partial neutralization of the carboxyl groups with, for example, an amine. These acrylic resins form stable solutions or dispersions in water, typically as a dispersed polymer having an average particle size diameter of 10 nm to 1 micron, preferably 20 to 400 nm.

Side chains of the graft copolymer are preferably hydrophobic relative to the backbone and therefore contain less than 1% by weight, but preferably zero percent by weight, based on the weight of the graft copolymer, of polymerized ethylenically unsaturated acid-functional monomers. The side chains contain polymerized hydrophobic monomers, such as, for example, alkyl methacrylates and acrylates, styrene, cycloaliphatic methacrylates and acrylates and aryl methacrylates and acrylates. They may also contain up to 30% by wt., based on the weight of the graft copolymer, of polymerized ethylenically unsaturated non-hydrophobic monomers which may contain functional groups. Examples of such monomers are hydroxy ethyl acrylate, hydroxy ethyl methacrylate, acrylamide, nitro phenol acrylate, nitro phenol methacrylate, phthalimido methyl acrylate, phthalimido methacrylate, acrylic acid, acryloamido propane sulfonic acid, and mixtures thereof.

The acrylic macromonomer may be prepared using a free radical initiator in a solvent with a Co (II) or Co (III) chelate chain transfer agent.

The backbone of the graft polymer contains preferably at least 2 percent by weight of an acid functional (neutralized) monomer, such as, for example, acrylic acid, methacrylic acid, maleic acid, itaconic acid and the like, and mixtures thereof. Methacrylic and acrylic acid are preferred. Other acids that can be used are ethylenically unsaturated sulfonic, sulfinic, phosphoric or phosphonic acid. Esters thereof can also be used, such as styrene sulfonic acid, acrylamido methyl propane sulfonic acid, vinyl phosphonic or phosphoric acid and the like.

The backbone is preferably based on 2-30% methacrylic acid, most preferably 3 to 15%, and has an MN=500-30,000. The acid functional groups on the graft copolymer are neutralized with an inorganic base or an amine. The backbone is thus relatively hydrophilic and keeps the graft polymer well dispersed in the resulting water-borne coating composition. Relative hydrophobicity or hydrophilicity can be further adjusted, if desired, by varying the percent of acid and/or hydroxy functional monomers versus more hydrophobic monomers such as 2-ethyl hexyl methacrylate.

In a preferred embodiment of the invention, when the water-soluble or water-dispersible organic binder for the barrier composition comprises one or more acrylic graft copolymers it (or they) will contain overall (including backbone and macromonomer arms, if any) from as low as 0 up to 40, but preferably 10 to 30, parts by weight of hydroxy functional acrylic monomers as, e.g., 2-hydroxyethyl acrylate, 2-hydroxyethyl methacrylate, 2-hydroxypropyl acrylate, 2-hydroxypropyl methacrylate, 2-hydroxybutyl acrylate, and 4-hydroxybutyl acrylate. These hydroxy groups can be used for crosslinking in addition to the acid groups. Hydroxy groups are not necessary when acid groups are the only crosslinking functionality on the copolymer.

After the graft copolymer is formed, it is neutralized with an amine or an inorganic base, such as ammonium hydroxide or sodium hydroxide, and then water is added to form a dispersion. Typical amines that can be used include AMP (2-amino-2-methyl-1-propanol), dimethyl-AMP, amino methyl propanol, amino ethyl propanol, dimethyl ethanol amine, triethylamine and the like. One preferred amine is amino methyl propanol, and a preferred inorganic base is ammonium hydroxide.

Another type of graft acrylic may be used wherein the graft is relatively hydrophilic and contains at least about 2% by wt. acid functional monomers, such as acrylic and methacrylic acid. The graft may contain from 2% to 30% by wt. of this acid functional monomer. The backbone of the polymer would be hydrophobic and contain less than 2% by wt. of the acid functional monomer.

Linear film-forming acrylic polymers, using similar monomers as in the above-described graft acrylic polymers with at least 2% by wt. acrylic acid or methacrylic acid may be used alone or in conjunction with the graft copolymer. The number average molecular weight of these acrylic polymers will be in the range of 3,000 to 100,000. The polymers can be neutralized using the same amines which are named in connection with the above-described graft polymers.

The term "polyvinyl alcohol" as used above refers to a polymer predominately comprising a monomer unit of vinyl alcohol, particularly a product obtained by hydrolyzing (saponifying) the ester of a vinyl acetate polymer or other such polymers as vinyl trifluoroacetate polymer, vinyl formate polymer, vinyl pivalate polymer, t-butyl vinyl ether polymer, and tromethylsilyl vinyl ether polymer. The degree of saponification is preferably 70 mole % or higher.

Water based urethanes listed above are of the basic types and include aliphatic polyester urethanes, aliphatic polycarbonate-diol urethanes, aliphatic polyether urethanes, acrylic modified urethanes, and other like modified urethanes. The polyurethane systems may incorporate low levels of co-solvents, for example, N-methylpyrrolidone, and may optionally contain additional cross-linking agents, such as siloxanes.

As indicated above, the organic binder component can comprise other film forming polymers such as acrylourethanes (e.g. Zeneca® R9699 resin), polyesters, copolyesters derived from a sulpho derivative of a carboxylic acid selected from sulphoterephthalic acid and sulphoisophthalic acid, polyester urethanes (e.g., Sanprene® UX5100A, Sanyo Chemical Industries, Ltd), polyethers and aliphatic or aromatic polyether urethanes (e.g., Zeneca® R960 resin). Typical acrylic latices useful in the invention are those made from monomers, such as alkyl methacrylates and acrylates; ethylenically unsaturated acid functional monomers, such as acrylic acid and methacrylic acid; and hydroxy functional monomers, such as hydroxyethyl acrylate or hydroxyethyl methacrylate. A latex, such as commercially available acrylic latices, e.g., Neocryl™ (ICI, Wilmington, Del.) can also be used as a component of the organic binder for the barrier composition. One can also use polyvinyl acetate latices (e.g., UCAR® Latex 379, Union Carbide).

The binder may be cured with a curing agent which contains N-methylol and/or N-methylol ether groups. Examples of such curing agents are amino resins obtained by reacting an aldehyde, such as formaldehyde, with a compound containing an amino group, such as melamine, urea and benzoguanamine and total or partial etherification of the N-methylol group with an alcohol, such as, for example, methanol, n-butanol, and isobutanol.

Other optional cross-linking agents for the water-soluble or water-dispersible organic binder are epoxy resins, such as Araldite® CY-184 (Ciba Geigy) or DEN® 431 (Dow Chemical Co.); isocyanates, such as XP-7063 (Bayer Corporation); aziridenes, such as Zeneca® CCX-100 (Zeneca Resins); carbodiimides, such as XL-29E (Union Carbide); urea formaldehyde resins, such as Beetle® 60 of Beetle® 65 (Cytec Industries); phenolic resins, such as GPRI-4000 phenolic resin (Georgia Pacific); and acid, such as the addict of cyclohexanedimethanol and methylhexahydrophthalic anhydride neutralized with dimethyl ethanol amine.

For those water-borne barrier coating compositions of the invention which contain a melamine cross-linking agent, the composition can also contain from about 0.1 to 1.0%, based on the weight of the organic binder, of a strong acid catalyst or a salt thereof which operates to lower curing temperatures and time. Paratoluene sulfonic acid or its ammonium salt are preferred catalysts. Other catalysts that can be used are dodecyl benzene sulfonic acid, phosphoric acid and amine or ammonium salts of these acids.

In addition, the water-borne binder composition of the invention may contain a variety of other optional ingredients, including pigments, pearlescent flakes, plasticizers, antioxidants, surfactants and flow control agents. The binder composition may also contain a co-solvent of the type which can be used in water borne compositions, such as isopropanol, butanol, butyl celosolve, propylene glycol monoethyl ether, propylene glycol monomethyl ether acetate and others.

To improve weatherability of a first coating layer produced from the barrier coating composition of the invention, an ultraviolet light stabilizer or a combination of ultraviolet light stabilizers can be added in the amount of from about 0.1 to 5% by wt., based on the weight of the binder. Such stabilizers include ultraviolet light absorbers, screeners, quenchers, and specific hindered amine light stabilizers and are typically selected from benzophenones, triazoles, triazines, benzoates, hindered amines and mixtures thereof. An antioxidant can also be added in an amount from about 0.1 to 5% by wt., based on the weight of the binder.

The composition may also include other formulation additives, such as thickeners, e.g., Acrylsol™ copolymers (Rohm & Haas); pigments; dispersants, e.g., sodium tripolyphosphate; and surfactants to assist wetting out of the water-borne coating composition during spray application e.g., nonyl phenyl ethoxylate, such as NP10 or NP8; or a fluorosurfactant, e.g., Zonyl® fluorosurfactant (E. I. du Pont de Nemours and Company, Wilmington, Del.).

A water-borne system is critical for achieving optimum gas barrier performance from the barrier composition of the invention. Water, even in the presence of up to about 10% by wt., based on total weight of solvent, of a co-solvent, influences exfoliation of the individual laminar mineral platelets and allows their free movement and orientation within the composition. When the barrier composition is applied to a polymeric substrate, e.g., the exterior surface of a blow molded PET bottle, via any convenient spray application technique and is then heated, i.e., cured, (e.g., at a temperature in the range of from 60 to 70° C. for from 10 to 15 minutes), it will form a dry first coating layer typically having a film thickness in the range of 20 microns, but more typically in the range of 8 microns or less. The individual mineral platelets will have oriented themselves and become fixed within the cured organic binder layer in a generally parallel three-dimensional and over-lapping spaced relationship. The gas barrier performance of a polymeric substrate coated in this manner is from 20 to 30 times or more greater, when compared, for example, by respective Oxygen Permeability Values, than the substrate alone.

In a preferred embodiment of the invention, the water-borne barrier coating composition comprises montmorillonite as the inorganic laminar mineral in the form of platelets having an aspect ratio of from 20 to 500 and an average particle size of less than 5 microns. (e.g., Montmorillonite Mineral Colloid MO available from Southern Clay Products, Inc., Texas, USA) The preferred organic binder for the first coating layer based on observed barrier performance is a blend of (i) melamine formaldehyde resin (including melamine formaldehyde with imino functionality, methylol functionality and partially or highly alkoxy methyl functionality) with (ii) from 5% to 25% by weight, based on the weight of the binder, of an acrylic latex. The preferred first coating layer of the barrier composition will contain (based on dry weight) from 10 to 75% w/w inorganic mineral platelets and from 25 to 90% w/w organic binder.

Second Clear Coat Layer

Because of the water solubility of the first coating layer, which renders a coated polymeric film or rigid, i.e., shaped, container highly recyclable, it is desirable for the coating to be fully, i.e., from 80% to 100%, cross-linked. For some applications, however, it may be desirable to employ a two-layer barrier coating system wherein a second coating layer is applied which is a solvent based two component clear coat which comprises (a) from 20 to 80% by wt. of an organic solvent and (b) from 80 to 20% by wt. of a binder component. A clear coat second coating layer imparts water resistance, impact resistance, hardness, mar resistance, appearance qualities (gloss and distinctness of image) and clarity, i.e., key performance properties, to the overall gas barrier coating system. It also insures more consistent overall performance since the underlying first barrier coating layer need not always be 100% cross-linked.

The binder component of the second clear coat composition can be an epoxy/amine cross-linked system or an epoxy/acid cross-linked system. Preferably, the binder component of the second clear coat composition is a system which includes a hydroxyl component with a cross-linking component, and is selected from the group consisting of:

I. (a) acrylic polymers which contain at least two functional hydroxyl groups and are derived from acrylates, methacrylates, styrene, and hydroxyl functional monomers of such acrylates, said acrylic polymers having a weight average molecular weight of between 3,000 and 50,000;
   (b) polyester resins having at least two functional hydroxyl groups and a weight average molecular weight of from 1000 to 15,000;
   (c) polyester urethanes and acrylo-urethanes having at least two functional hydroxyl groups;
   (d) hydroxyl functional linear or branched cycloaliphatic moiety-containing reactive oligomers or a blend of such oligomers; and II. aliphatic or aromatic isocyanates having at least two functional isocyanate groups where the ratio of isocyanate to hydroxyl functionality is from 0.5 to 3.0, based on equivalents.

The organic solvent component of the second coating layer is selected from the group consisting of aromatic hydrocarbons selected from petroleum naphtha and xylenes; ketones selected from methyl amyl ketone, methyl isobutyl ketone, methyl ethyl ketone and acetone; esters selected from butyl acetate and hexyl acetate, and glycol ether esters.

The hydroxyl component of the binder may include a linear or branched cycloaliphatic moiety-containing reactive oligomer or a blend of such oligomers. The reactive oligomer is provided with a GPC weight average molecular weight not exceeding about 3000, but preferably in the range of from 500 to 1200.

The hydroxyl component of the binder for the second clear coat composition may be blended with non-alicyclic (linear or aromatic) oligomers, if desired. Such non-alicyclic-oligomers may be made using non-alicyclic anhydrides, such as succinic or phthalic anhydrides, or mixtures thereof. Caprolactone oligomers may be also used.

The acrylic polymer component of the second layer has a GPC weight average molecular weight above 3000, and preferably in the range of from 8000 to 12,000. The $T_g$ of the acrylic polymer will vary generally in the range of from 0° C. to 100° C., but may be higher or lower. The acrylic polymer may be any conventional solvent-soluble acrylic polymer conventionally polymerized from typical monomers, such as alkyl (meth)acrylates having alkyl carbon atoms in the range of from 1 to 18, and styrene and functional monomers, such as, hydroxy ethyl acrylate and hydroxy ethyl methacrylate.

In addition to the forgoing polymers, the hydroxyl component of the clear coat binder may further contain up to 40% by wt., based on the total weight of the binder, of a dispersed acrylic polymer which is a polymer particle dispersed in an organic media, wherein the polymer particle is emulsion stabilized by what is known as steric stabilization, and the polymer particle is provided with a core having macromonomer chains or arms attached to it. The average particle size of the core is in the range of from 0.1 to 0.5 microns.

The dispersed acrylic polymer includes in the range of from about 10% by wt. to 90% by wt., based on the weight of the dispersed polymer, of a core formed from high molecular weight polymer having a weight average molecular weight of about 50,000 to 500,000. The arms make up about 10% by wt. to 90% by wt., based on the weight of the dispersed polymer. The arms are formed from a low molecular weight polymer having weight average molecular weight in the range of from 3000 to 15,000.

The core of the dispersed acrylic polymer is comprised of polymerized acrylic monomer(s) optionally copolymerized with ethylenically unsaturated monomer(s). Suitable monomers include styrene, alkyl (meth)acrylate having alkyl carbon atoms in the range of from 1 to 18; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described above.

The hydroxyl binder may also include a polyester which has a GPC weight average molecular weight greater 1500, but preferably in the range of from 2000 to 5000. The Tg of the polyester will vary in the range of from −50° C. to +100° C., but typically Tg will be in the range of from −20° C. to +50° C.

Polyesters suitable for use with the hydroxyl binder in the second clear coat composition of the present invention may be any conventional solvent soluble polyesters conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols.

The second coating layer composition employs a cross-linking component which may include an oligomeric cross-linker or a blend thereof. The cross-linker is provided with at least two isocyanate groups such that the ratio of equivalents of isocyanate of the oligomeric cross-linker per equivalent of the hydroxyl of the hydroxyl component is in the range of from 0.5/1 to 3.0/1, but preferably in the range of from 0.8/1 to 1.3/1. Suitable oligomeric cross-linkers include aromatic, aliphatic, or cycloaliphatic isocyanates, trifunctional isocyanates and isocyanate functional adducts of a polyol and difunctional isocyanates. More specific isocyanates include diisocyanates such as 1,6-hexamethylene diisocyanate, isophorone diisocyanate, 4,4'-biphenylene diisocyanate, toluene diisocyanate, biscyclohexyl diisocyanate, tetramethylene xylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Suitable trifunctional isocyanates include triphenylmethane triisocyanate, 1,3,5-benzene triisocyanate, and 2,4,6-toluene triisocyanate. Trimers of diisocyanate, such as the trimer of hexamethylene diisocyante available under the trademark Desmodur® N-3390 from Bayer Corporation, Pittsburgh, Pa. and the trimer of isophorone diisocyanate are also satisfactory. Furthermore, trifunctional adducts of triols and diisocyanates are also suitable. Trimers of diisocyanates are preferred and trimers of isophorone and hexamethylene diisocyantes are more preferred.

The cross-linking component may optionally include other cross-linkers of the type selected from aldimine oligomers, which are the reaction products of alkyl aldehydes, such as, isobutyraldehyde with diamines, such as isophorone diamine; ketimine oligomers, which are the reaction product of alkyl ketones, such as, methyl isobutyl ketone with diamines, such as 2-methyl pentamethylene diamine; and polyaspartic esters, which are the reaction product of diamines such as, isopherone diamine with dialkyl maleates such as, diethyl maleate. All of the foregoing additional cross-linkers are commercially available, such as, for example, those supplied under the trademark Desmophen® amine co-reactants by Bayer Corporation, Pittsburgh, Pa.

The cross-linking component of the binder preferably includes a catalytic amount of a catalyst for accelerating the curing process. Generally, the amount of catalyst needed for satisfactory results will be in the range of from about 0.001% by wt. to about 5% by wt., but preferably in the range of from 0.02% to 1% by wt., based on the total weight of binder solids in the composition. A wide variety of catalysts can be used, such as tin compounds, including dibutyl tin dilaurate; and tertiary amines, such as, triethylenediamine. These catalysts can be used alone or in conjunction with carboxylic acids, such as acetic acid. One of the preferred commercially available catalysts is marketed under the trademark, Fastcat® 4202 dibutyl tin dilaurate and is available from Elf-Atochem North America, Inc. Philadelphia, Pa.

The hydroxyl or cross-linking component of the binder of the second coating composition contains at least one organic solvent which is typically selected from the group consisting of aromatic hydrocarbons, such as petroleum naphtha or xylenes; ketones, such as methyl amyl ketone, methyl isobutyl ketone, methyl ethyl ketone or acetone; esters, such as butyl acetate or hexyl acetate; and glycol ether esters, such as propylene glycol monomethyl ether acetate. The amount of organic solvent employed depends upon the desired solids level as well as the desired amount of VOC of the composition. If desired, the organic solvent may be added to both components of the binder.

The second layer clear coat composition may also contain conventional additives, such as UV screeners and organic or inorganic pigments for tinting the otherwise clear coat for color, stabilizers, rheology control agents, flow control agents and toughening agents depending on the intended end use for the coated polymeric substrate. The foregoing additives may be added to either the hydroxyl or cross-linking component, or to both, depending upon the intended use for the coating composition.

The coating compositions of the invention can be applied to practically any polymeric substrate by any convenient spray method including air spraying or an electrostatically assisted spray application method including compressed air spray, mini bells, and discs. The coating compositions are also suitable for airless spray application, or by doctor blade and roller coat application, but spray application is preferred for obtaining optimum orientation of the mineral platelet particles within the applied barrier coating layer, and, thereby, optimum and consistent barrier performance. For applications which require only the first barrier coating layer, the coating is allowed to flash at ambient conditions for a short period of time, usually less than two minutes, during which time water can evaporate, and then the coated substrate is placed in an oven for additional curing at a predetermined elevated temperature. For applications which require the two-coating layer system, the barrier layer is spray applied and allowed to flash at ambient temperature for up to two minutes or less. Evaporation of the water in the barrier layer can be accelerated using infra-red lamps or via oven curing at a temperature of from 50° to 60° C. for from 10 to 30 minutes. Higher temperatures, e.g., from 60° to 80° C., may also be used in situations where complete curing of the barrier layer is required before application of the clear coat. The solvent based clear coat is applied after flashing and/or heating the barrier layer, and the two-layer system is then allowed to flash at ambient conditions for up to 2 minutes. Thereafter, coated substrates are oven cured at from 60° to 80° C. for from 10 to 30 minutes. The curing temperatures and curing times may vary widely and will depend on economics (i.e., cure time vs. temperature) and on the type of polymeric substrate being cured and the time over which it can withstand elevated temperatures without melting or otherwise degrading.

The invention is illustrated in greater detail with reference to the Examples which follow, however, the invention is not to be limited by the Examples.

Spray Application Method

Test specimens were sprayed using a standard De Vilbis air supported hand-held spray gun. The air pressure supply was set between 40 and 70 psi (275.8 to 482.6 kPa) depending on the viscosity of the composition being sprayed. Spraying took place onto a 0.5 liter or 2 liter PET bottle while it was rotated about its long axis between 200 to 400 rpm. The spray gun was passed up and down the length of the rotating bottle at a rate of one pass every 2 seconds for the 2-liter bottle for a predetermined number of passes, usually between 2 to 15 passes from a distance of about 15 cm. The objective was to insure coverage of the main side wall, shoulder, base and neck region of each test specimen at a generally uniform coating thickness in the range of 12 microns or less. Coated test specimens were then placed in an air circulating oven to dry at a temperature of from 60° C. to 70° C. for between 5 and 15 minutes.

Surface Pre-Treatment

In some cases it may be desirable to pre-treat the surface of the polymeric substrate to be coated to enhance adhesion of the first coating layer to the substrate and/or to improve wetting of the substrate by the coating composition. Thus, the instant invention includes the optional step of treating the surface of the container that will be receiving the coating composition with a means to improve surface adhesion characteristics whereby the coating composition will consistently and uniformly adhere to the substrate surface when it dries. Means or methods for surface pre-treatment are conventional and include flame treating, application of a chemical mist, and by exposing the polymeric surface to a plasma for a predetermined period of time.

Oxygen Permeability Value

Oxygen permeability was determined by cutting a 10×10 cm square from the side wall of a coated PET bottle and measuring oxygen transmission through the specimen using a Mocon, Oxtran 10/50 s/n 1187145 at 30° C. and 90% relative humidity. The container wall sample was place in the Mocon test cell with nitrogen carrier gas flowing above and below the sample, and it was left to equilibrate over night in order to flush dissolved oxygen from the sample and obtain a background reading. The nitrogen above the sample was then replace with oxygen and left to equilibrate over night, and then the amount of oxygen which had permeated through the sample was measured using a sensor. The average thickness of the sample was measured using a micrometer, and this measurement was used to calculate the oxygen permeability for standard units of cc mil/100 $in^2$/day/atm. Control measurements were carried out on uncoated bottles in the same way. Typical wall thickness for commercially produced PET bottles for carbonated beverages and soft drinks are between 200-350 microns. Color was measured using a Colorgard 2000/45 instrument to give values of b* (yellowness) with lower values indicating lower color. The ash weight of samples was determined by heating the sample to 600° C. and thereafter measuring the residual weight of the sample.

Preparation of Gas Barrier Coating Composition

Unless otherwise indicated, a general procedure was followed in preparing water-borne gas barrier coating compositions according to the invention for the following examples. A 2 kg slurry containing 4% by wt. montmorillonite clay was first prepared by combining 120 g montmorillonite clay with 1871 g demineralized water in a 4-liter beaker. The demineralised water was added to the 4-liter beaker, and the beaker was placed under a Silverson high shear mixer with the mixer head positioned to one side of the beaker for maximum mixing efficiency with reduced entrapment of air. Mixer was begun at 2500 rpm. Mixer rpm was increased to 8200 rpm and the montmorillonite clay was added slowly to allow for dispersal in the water. The mixture was stirred for 5 minutes, and then the mixer head was raised and cleaned of un-dispersed clay, which was added back to the slurry. Mixing was then continued, and the rpm increased steadily to 8200 rpm. This process was repeated until a uniform slurry without lumps or agglomerates was observed, which took about 30 minutes.

The organic binder component was prepared by first weighing 13.5 g of Cymel® 385 (available from Cytec Industries as 79% w/w aqueous solution) into a 250 ml beaker. To this was added 89 grams of demineralized water, and the mixture was stirred using a magnetic stirrer until the Cymel® 385 was completely dissolved in the water (about 5 minutes). Thereafter 3.5 ml of PTSA 10% solution and 0.5 ml of Synperonic NP10 10% solution were added 'dropwise' to the solution and allowed to stir for an additional 10 minutes.

Then 370 grams of the montmorillonite slurry was weighed into a 1000 ml beaker and stirred using an anchor type stirrer with an air powered motor. The slurry was stirred rapidly at first to break up the thixotropy. When the slurry had become mobile, the stirrer was then slowed to the point where there was a vortex which just covered the stirrer paddles. The prepared binder solution was then poured into a dropping funnel and added very slowly through this to the stirred montmorillonite slurry. This process took about 20 minutes to complete and was carried out to ensure even mixing. When the addition was finished the stirrer speed was lowered so that the vortex disappeared, but the whole of the solution was still mobile. The resulting mixture was stirred slowly for about 30 minutes which allowed the mixture to de-aerate and then the coating composition was ready for use.

An acrylic resin composition used as a component of the second clear coat layer in the examples which follow was prepared as follows:

Acrylic Resin

I. The following ingredients (in grams) were loaded into a reactor with agitator and heated to reflux (150° to 155° C.) under nitrogen purge.

| | |
|---|---|
| Aromatic 100 (Exxon) | 233.81 |
| Propylene glycol monomethyl ether acetate | 53.64 |
| Xylene | 56.67 |

II. The following ingredients were loaded into a monomer feed tank in the order shown and mixed for 10 minutes. The mixture was fed simultaneously through a diptube with feed IV over 300 minutes. Reflux was maintained with minimum heat.

| | |
|---|---|
| Styrene | 136.54 |
| N-butyl methacrylate | 234.85 |
| Hydroxy ethyl acrylate | 174.77 |

III. Rinse for II through diptube; complete rinse prior to completion of step IV.

| | |
|---|---|
| Aromatic 100 (Exxon) | 4.94 |

IV. The following ingredients were loaded in the order shown into an initiator feed tank, and mixed simultaneously, being fed through a diptube with Feed II over 330 minutes. Feed IV overlapped Feed II by 30 minutes. On completion of Feed IV, the mixture was held for 30 minutes and reflux was maintained.

| | |
|---|---|
| 75% t-butyl peroxyacetate | 24.18 |
| Aromatic 100 (Exxon) | 20.76 |
| Xylene | 15.94 |
| Propylene glycol monomethyl ether acetate | 14.17 |

V. Rinse for IV through diptube:

| | |
|---|---|
| Propylene glycol monomethyl ether acetate | 1.97 |

VI. Heat to strip off 117.24 lbs./100 gal of batch.
Weight Solids = 66%
Gardner Holt Viscosity = X to Z
Weight Average Molecular Weight = 6,000 to 7,500 as measure by GPC.

A polyester resin composition used as a component of the second clear coat layer in the examples which follow was prepared as follows:

Polyester Resin

I. The following ingredients (in grams) were added to a reactor in the order shown with mixing at 50-80° C. The batch was heated to 240-250° C., distilled to remove water and held for acid no. < 5.

| | |
|---|---|
| 90% neopentyl glycol in demineralized water | 200.18 |
| 1,6-hexanediol | 53.96 |
| Trimethylolpropane | 115.29 |
| Isophthalic acid | 94.58 |
| Azelaic acid | 294.63 |
| Phthalic anhydride | 63.64 |

II. Add to cool, and thin when acid no. = 2-5:

| | |
|---|---|
| Xylene | 62.12 |

III. Add to thin:

| | |
|---|---|
| Toluene | 14.57 |
| Xylene | 11.70 |

IV. Use as reactor rinse and solids adjustment:

| | |
|---|---|
| Methyl ethyl ketone | 76.98 |
| Total | 987.65 |
| Water Loss | 113.65 |
| Yield | 874.00 |

Weight Solids = 81.0%
Gardner Holt Viscosity = X + 1/4 to Z + 1/4
Acid Number = 2-5
Hydroxyl Number = 130 to 145

Aqueous Branched Acrylic Resin Synthesis (Used as a Component in the Aqueous Barrier Coating Composition, e.g., #3)

Step A) Macromonomer synthesis:—To a 2-liter flask fitted with reflux condenser, addition pumps, agitator and heating mantle was added 57.2 grams of methacrylic acid and 212.7 grams Methyl methacrylate and 322.1 grams Isopropanol. The mixture was agitated and the temperature raised to reflux (82-85° C.) under a nitrogen blanket. A mixture of 10.4 grams Methyl ethyl ketone, 43.9 grams isopropanol, 0.012 grams dimethyl glyoxime cobalt (III) chain transfer catalyst and 0.258 grams 2,2-azobis-(2,4-dimethylvaleronitrile) was agitated until both the chain transfer catalyst and initiator were dissolved. This mixture was then added as a shot to the refluxing batch in the 2-liter flask, and the resulting mixture held at agitation and reflux temperature for 5 minutes. An initiator feed mixture was prepared by dissolving 0.039 grams of cobalt (iii) chain transfer catalyst and 2.84 grams 2,2-azobis-(2,4-dimethylvaleronitrile) in 31.1 grams methyl ethyl ketone and 65.1 grams isopropanol. A monomer feed mixture was prepared by mixing together 85.7 grams methacrylic acid, 141.8 grams methyl methacrylate and 6.2 grams isopropanol. The monomer and initiator feeds were simultaneously added to the refluxing, agitating mixture in the 2-liter flask with the following feed schedules: 55% of the initiator feed was added over 90 minutes and the remaining 45% was fed over 240 minutes. 67% of the monomer feed was added over 120 minutes, and the remaining 33% fed over 120 minutes. 179.6 grams of isopropanol was added to the refluxing batch following addition of the monomer and initiator feeds. The batch was then held at reflux for 30 minutes and subsequently cooled to room temperature. Weight solids of the resulting copolymer solution was 43.2%. Molecular weights measured via GPC with polystyrene as standard are: number average 2000 and weight average 5500.

Step B) Preparation of aqueous branched polymer:—To a 2-liter flask fitted with reflux condenser, addition pumps, agitator and heating mantle was added 81.6 grams isopropanol and 505.8 grams macromonomer as prepared above in Step A). The mixture was agitated and the temperature raised to reflux (84-89° C.) under nitrogen blanket. A mixture of 108.8 grams styrene, 163.2 grams n-butyl methacrylate, 152.3 grams 2-ethyl hexyl methacrylate, 65.3 grams methyl methacrylate and 54.4 grams hydroxy ethyl acrylate was fed over 210 minutes simultaneously with a mixture of 54.4 grams butyl acetate and 9.8 grams t-butyl per octoate which was fed over 210 minutes while maintaining agitation and reflux conditions. The monomer feed, when complete, was followed by the addition of 2.0 grams butyl acetate, and the initiator feed, when complete, was followed by the addition of 2.0 grams butyl acetate over a minute. The reaction mixture was held at reflux for 180 minutes following completion of the initiator feed and then cooled to room temperature. Weight solids of the resulting copolymer solution was 62.9%. Molecular weights measured via GPC with polystyrene as standard were: number average 6948 and weight average 15,320.

Step C) Preparation of dispersion in water:—To a 2-liter flask fitted with reflux condenser, addition pumps, agitator and heating mantle was added 350 grams of aqueous branched polymer from step B) above. The polymer solution was agitated and heated to reflux and 21 grams of solvent stripped off. The polymer solution was then cooled to less than 50° C. and 16.7 grams of dimethyl ethanol amine and 10 grams de-ionized water was added, and the resulting neutralized polymer was agitated for 15 minutes. This was followed by the addition of 411.9 gms de-ionized water over 30 minutes with agitation. The resulting dispersion of aqueous branched polymer in water was cooled to room temperature. Weight solids were 24.6% and viscosity was 105 cps as measured on a Brookfield viscometer at 5 rpm with #3 spindle. Particle size was 81 nm as measured by Quasic elastic light scattering.

Preparation of Acrylic Latex (Used as a Component in the Aqueous Barrier Coating Composition, e.g., #4 and #7):

To a 5 liter flask fitted with reflux condenser, addition pumps, agitator and heating mantle is added 1003.7 grams De-ionized water, 5.3 grams Trem LF 40 (anionic surfactant from Henkel Corporation) and 3.8 grams Polystep B-1 (surfactant from Stepan Corporation). The mixture is agitated and heated to 86 to 88 C under nitrogen blanket. A monomer mixture comprising of 15.2 grams Trem LF 40, 10.6 grams Polystep B-1, 36.5 grams Hydroxy ethyl acrylate, 36.5 grams Methacrylic acid, 54.6 grams of a 60% solution of N-methylol methacrylamide in de-ionized water, 182.5 grams styrene, 601.6 grams 2-ethyl hexyl acrylate, 319.4 grams methyl methacrylate and 705.7 grams de-ionized water is agitated to form an emulsion. Separately an initiator mixture comprising of 130.6 grams de-ionized water and 3.0 grams ammonium persulfate is mixed and agitated. After preparation of the emulsified monomer feed and initiator feed, 210 grams of the monomer feed and 14.3 grams of the initiator feed are simultaneously added as shots to the agitating water mixture in the 5 liter flask. Contents of the 5 liter flask are held at 86-88° C. with agitation for 15 minutes. This is followed by a shot addition of the remainder of the initiator mixture and, following leveling of the temperature to 86 to 88° C. the remainder of the monomer mix is fed to the flask over 100 minutes maintaining a temperature and agitation. 40 grams of de-ionized water are added to the reaction mixture following completion of the monomer feed and the batch held at 86 to 88° C. for 60 minutes. The reaction mixture is then cooled to 64 to 66° C. A mixture of 102.8 grams de-ionized water, 34.8 grams of a 29% solution of ammonia in de-ionized water and 3.0 grams of Biochek® 240 (biocide from Calgon Corporation) is then added over 20 minutes to the batch with agitation. The batch is held at 64 to 66° C. for additional 30 minutes. 40.0 Grams de-ionized water is then added and the batch held at 64 to 66° C. for 120 minutes. 128.7 Grams of de-ionized water is added after this hold and the batch cooled to room temperature. Weight solids of the resulting latex are 35.7% and the pH is 8.8 to 9.2.

EXAMPLES

Barrier Coating Composition #1

355.2 grams of de-ionized water and 14.8 grams of montmorillonite clay (Mineral Colloid MO from Southern Clay Co.) were combined in a high speed mixer and mixed at low speed (2000 rpm) until incorporated. The speed of the mixer was increased to 5000 rpm for 30 minutes. Thereafter, in the following order 89.0 grams of de-ionized water, 13.5 grams of melamine formaldehyde resin (Cymel® 385 from Cytec Industries), and 35.0 grams of a 1% solution of paratoluene sulfonic acid in de-ionized water were added to the mixture, and the mixture was mixed at 2000 rpm for an additional 15 minutes.

Barrier Coating Composition #2

| | |
|---|---|
| I - The following ingredients (wt. in grams) were combined in the order shown in a high speed mixer and mixed at (2000 rpm) until dissolved: | |
| De-ionized water | 85.902 |
| Sodium Tripolyphosphate | 0.179 |
| II - Added with continuous mixing at 2000 rpm: | |
| Mineral Colloid MO | 3.580 |
| III - Mixer speed was increased to 5000 rpm for 30 minutes. | |
| IV - Mixer speed was decreased to 2000 rpm and the following additional ingredients were added in the order shown, and mixing was continued for an additional 15 minutes: | |
| De-ionized water | 7.014 |
| Cymel ® 385 (melamine formaldehyde resin) (Cytec Industries) | 3.265 |
| 10% Synperonic NP10 non-ionic surfactant in de-ionized water (ICI Americas) | 0.120 |
| 0.63% solution of paratoluene sulfonic acid in de-ionized water | 15.485 |

Barrier Coating Composition #3

| | |
|---|---|
| I - The following ingredients (wt. in grams) were combined in the order shown in a high speed mixer and mixed at 2000 rpm until incorporated: | |
| De-ionized water | 96.0 |
| Mineral Colloid MO (Southern Clay) | 4.0 |
| II - Mixer speed was increased to 5000 rpm for 30 minutes. | |
| III - Mixer speed was decreased to 2000 rpm, and the following additional ingredients were added in the order shown, and mixing was continued for an additional 15 minutes: | |
| Aqueous branched acrylic resin | 4.9 |
| Cymel ® 385 (Melamine formaldehyde resin, Cytec Industries) | 3.5 |

Barrier Coating Composition #4

| | |
|---|---|
| I - The following ingredients (wt. in grams) were combined in the order shown in a high speed mixer and mixed at 2000 rpm until incorporated: | |
| De-ionized water | 96.0 |
| Mineral Colloid MO (Southern Clay) | 4.0 |
| II - Mixer speed was increased to 5000 rpm for 30 minutes. | |
| III - Mixer speed was decreased to 2000 rpm, and the following additional ingredients were added in the order shown, and mixing was continued for an additional 15 minutes: | |
| Acrylic latex | 3.43 |
| Cymel ® 385 (Melamine formaldehyde resin from Cytec Industries) | 3.5 |

Barrier Coating Composition #5

| | |
|---|---|
| I - The following ingredients (wt. in grams) were combined in the order shown in a high speed mixer and mixed at 2000 rpm until incorporated: | |
| De-ionized water | 96.0 |
| Mineral Colloid MO (Southern Clay) | 4.0 |
| II - mixer speed was increased to 5000 rpm for 30 minutes. | |
| III - Mixer speed was decreased to 2000 rpm, and the following additional ingredients were added in the order shown, and mixing was continued for an additional 15 minutes: | |

-continued

| | |
|---|---|
| Zeneca ® R-9699 resin | 5.0 |
| (Acrylic modified urethane) | |
| Cymel ® 385 (Melamine formaldehyde resin, Cytec Industries) | 2.5 |

Barrier Coating Composition #6

I - The following ingredients (wt. in grams) were combined in the order shown in a high speed mixer and mixed at 2000 RPM until incorporated
| | |
|---|---|
| De-ionized water | 96.0 |
| Mineral Colloid MO (Southern Clay) | 4.0 |

II - Mixer speed was increased to 5000 RPM for 30 minutes.
III - Mixer speed was decreased to 2000 RPM, and the following additional ingredients were added in the order shown, and mixing was continued for an additional 15 minutes:
| | |
|---|---|
| 30% solution of Carbowax 8000 (Polyethylene Glycol from Union Carbide) in De-ionized water | 13.33 |

Barrier Coating Composition #7

I - The following ingredients (wt. in grams) were combined in the order shown in a high speed mixer and mixed at 2000 RPM until dissolved
| | |
|---|---|
| De-ionized water | 56.17 |
| Sodium Tripolyphosphate | 0.23 |

II - The following ingredient (wt. in grams) was added in a high speed mixer and mixed at 2000 RPM until incorporated
| | |
|---|---|
| Mineral Colloid MO (Southern Clay) | 44.68 |

III - Mixer speed was increased to 5000 RPM for 30 minutes.
IV - Mixer speed was decreased to 2000 RPM, and the following additional ingredients were added in the order shown, and mixing was continued for an additional 15 minutes:
| | |
|---|---|
| De-ionized water | 32.29 |
| Acrylic latex (described earlier) | 1.33 |
| Cymel ® 385 (Melamine Formaldehyde resin from Cytec Industries) | 5.3 |

Clear Coat #1 (Isocyanate 2-Component Composition)

Component 1

The following ingredients (wt. in grams) were combined in the order shown and mixed for 30 minutes:

| | |
|---|---|
| Acrylic resin | 37.5 |
| Polyester resin | 10.31 |
| Propylene glycol monomethyl ether acetate | 13.8 |

The following ingredients, accurately weighed, were combined with mixing in the order shown and the resulting mixture was mixed an additional 45 minutes:

| | |
|---|---|
| Acetic acid | 0.1 |
| 20% BYK-301 Silicone resin in propylene glycol monomethyl ether acetate (BYK Chemie) | 0.5 |
| 1% dibutyltin dilaurate in methyl ethyl ketone | 4.0 |

Component 2

The following ingredients were combined in the order shown and mixed for 15 minutes:

| | |
|---|---|
| Butyl acetate | 5.66 |
| Xylene | 5.67 |
| Propylene glycol monomethyl ether acetate | 11.33 |
| Tolonate ® HDT-LV (Isocyanurate trimer of hexamethylene diisocyanate) (Rhone Poulenc) | 16.82 |

Clear Coat #2

Isocyanate Clear

The following ingredients (wt. in grams) were combined in the order shown and mixed for 15 minutes:

| | |
|---|---|
| 690S (Clear component #1, E. I. du Pont de Nemours and Company) | 25 |
| AK-260 Isocyanate activator (E. I. du Pont de Nemours and Company) | 8.8 |
| 1% dibutyltin dilaurate in methyl ethyl ketone | 1.2 |

Clear Coat #3

Tinted Isocyanate Clear

The following ingredients (wt. in grams) were combined in the order shown:

| | |
|---|---|
| Clear Coat #1 | 105.69 |
| 832J (Universal Tint, E. I. du Pont de Nemours and Company) | 8.75 |

Clear Coat #4 (Isocyanate 2-Component Clear Composition)

Component 1

The following ingredients (wt. in grams) were combined in the order shown and mixed for 15 minutes:

| | |
|---|---|
| Acrylic resin | 25.0 |
| Polyester resin | 20.62 |
| Propylene glycol monomethyl ether acetate | 15.7 |

The following ingredients, weighed accurately, were then added with mixing in the order shown, and the resulting mixture was mixed for an additional 45 minutes:

| | |
|---|---|
| Acetic acid | 0.1 |
| 20% BYK-301 (Silicone resin) in propylene glycol monomethyl ether acetate | 0.5 |
| 1% dibutyltin delaurate in methyl ethyl ketone | 3.95 |

Component 2

The following ingredients (wt. in grams) were combined in the order shown with mixing for 15 minutes:

| | |
|---|---|
| Butyl acetate | 3.59 |
| Xylene | 3.59 |
| Propylene glycol monomethyl ether acetate | 7.17 |
| Tolonate HDT-LV (Isocyanurate trimer of hexamethylene diisocyanate) (Rhone Poulenc) | 16.33 |

The barrier compositions (water borne layer mineral coatings) were spray applied to test specimens: (i) one surface of a 10 mil thick PET film as the substrate and (ii) one surface of a 1 mil biaxially oriented polyester film—by spraying the compositions thereover to achieve a generally uniform dry film thickness of about 0.3 mils. The coated substrates were held at room temperature for 10 to 15 minutes, i.e., allowed to flash, after which the substrates were held and allowed to cure for an additional 15 minutes at 70° C. The coated substrates were then allowed to cool at room temperature for about 5 minutes before being coated via spray application with a second clear coat layer. The clear coat components from the 2-component compositions were mixed immediately prior to spray application. Viscosity of the clear coat was 14-18 seconds as measured using a Zahn viscosity cup. The coated substrates were then held at room temperature, i.e., allowed to flash, for from 10 to 15 minutes and then held for an additional 15 minutes at 70° C. The dry film thickness of the clear coats ranged from 0.4 to 0.6 mils. The resulting coated substrates were then measured to determine their respective Oxygen Permeability Values according to the procedure described above and other respective properties, e.g., Humidity Resistance by immersion in water for 20 minutes at 60° C. The test panels were rated for appearance (whitening and blistering), Flexibility Gardner Impact Resistance tested on PET over a flexibility rim panel (PET panel was placed over rim panel for test), Scratch resistance by thumbnail scratch.

The results are shown below:

Barrier Coating #1, Clear Coat #2, Film Test Specimen (ii)
  Oxygen Permeability Value: <0.05 cc mil/100 in$^2$/day/atm
  Humidity Resistance—good
  Scratch resistance—excellent
  Un-Coated Test Specimen (ii)
  Oxygen Permeability Value: 2.62 cc mil/100 in$^2$/day/atm
Barrier Coating #2, Clear Coat #1, Film Test Specimen (i)
  Humidity Resistance—good
  Flexibility tested by 180° bend—good
  Gardner Impact Resistance (Direct)—160 in-pounds
  Scratch resistance—excellent
Barrier Coating #2, Clear Coat #4, Film Test Specimen (i)
  Humidity resistance—good
  Flexibility tested by 180° bend—good
  Gardner Impact resistance (Direct)—160 in-pounds
  Scratch resistance—excellent
Barrier Coating #1, Clear Coat #1, Film Test Specimen (ii)
  Coated Film:
  Oxygen Permeability Value=<0.05 cc mil/100 in$^2$/atm/day
  Un-Coated Film:
  Oxygen Permeability Value=2.62 cc mil/100 in$^2$/atm/day
  Scratch Resistance—excellent
Barrier Coating #3, Clear Coat #1, Over Film Test Specimen (ii)
  Oxygen Permeability Value: <0.03 cc mil/100 in$^2$/atm/day.
Barrier Coating #4, Clear Coat #1, Over Film Test Specimen (ii)
  Oxygen Permeability Value: <0.03 cc mil/100 in$^2$/atm/day.
Barrier Coating #5, Clear Coat #1, Over Film Test Specimen (ii)
  Oxygen Permeability Value: <0.05 cc mil/100 in$^2$/atm/day.
Barrier Coating #6 Clear Coat #1. Over Film Test Specimen (ii)
  Oxygen Permeability Value:=0.05 cc mil/100 in$^2$/atm/day.
Barrier Coating #7, Clear Coat #1, Over Film Test Specimen (ii)
  Oxygen Permeability Value:=<0.03 cc mil/100 in$^2$/atm/day.

Clear Coat #3, Film test specimen (i)—UV Transmission

Clear was tested for % UV transmission through the film at 0.6 mil coating layer thickness. The coating layer had a greenish-yellow tint with a % UV transmission at wavelengths less than 400 nm being less than 20%.

The examples which follow further illustrate the gas barrier coating composition of the invention.

Example 1

The following gas barrier coating composition was prepared and sprayed onto a test specimen according to the procedures described above.

| | |
|---|---|
| 370 g | 4 w/w % Montmorillontite Mineral Colloid MO slurry |
| 89 g | De-mineralized Water |
| 13.5 g | Cymel ® 385 |
| 3.5 ml | Para-toluene Sulphonic Acid 10% solution |
| 0.5 ml | Synperonic NP10 10% solution |

Example 2

The following gas barrier coating composition was prepared as above, but less montmorillonite was used in the final coating formulation (i.e., to yield 34% clay solids in final dry coating.

| | |
|---|---|
| Montmorillonite mineral colloid MO (as 4% w/w slurry in water) | 143.4 g |
| Cymel ® 385 | 13.5 g |
| PTSA (10% w/w aqueous solution) | 3.5 ml |
| Synperonic NP10 (10% w/w in water) | 0.5 ml |
| Demineralised Water | 89.0 g |

Example 3

The following gas barrier coating composition was prepared according to the procedures described above, except that the clay slurry had a higher solids loading and montmorillonite was replaced with Laponite (from Southern Clay Products)

| | |
|---|---|
| Laponite RDS (18% w/w slurry in water) | 164.4 g |
| Cymel ® 385 | 27.0 g |
| PTSA (10% w/w solution) | 7.0 ml |
| Synperonic NP10 (10% w/w solution) | 1.0 ml |
| Demineralised Water | 89.0 g |

Example 4

The following gas barrier coating composition was prepared as described above, except that the clay slurry was pre-supplied in solution from the supplier and was simply sheared in the Silverson mixer.

| | |
|---|---|
| SCPX 944 (experimental organo cation exchanged Montmorillonite Grade, Southern Clay Products, Inc) (10.8% w/w aqueous slurry) | 200 ml |
| Cymel ® 385 | 13.5 g |
| De-mineralized Water | 89.0 g |
| PTSA (10% w/w aqueous solution) | 3.5 ml |
| Synperonic NP10 (10% w/w aqueous solution) | 0.5 ml |

Example 5

To achieve lower viscosities, sodium tripolyphosphate was added to the barrier composition. This reduced the viscosity of a 4% montmorillonite slurry from 29 seconds to 9 seconds, measured using a Seta No 6 flow cup. The gas barrier coating composition was prepared as above except that sodium tripolyphosphate was added to the demineralised water while the mixer was at 2500 rpm, and the tripolyphosphate was allowed to dissolve for 5 minutes

| | |
|---|---|
| Montmorillonite mineral colloid MO 4.5% slurry (consisting of 14.8 g mineral colloid MO, 0.74 g sodium tripolyphosphate and water) | 329.0 g |
| Cymel ® 385 | 13.5 g |
| PTSA (10% w/w aqueous solution) | 3.5 ml |
| Synperonic NP10 (10% w/w in water) | 0.5 ml |
| Demineralised Water | 30.0 g |

Example 6

| | |
|---|---|
| Montmorillonite mineral colloid MO 4% slurry (consisting of 14.8 g mineral colloid MO, 0.74 g sodium tripolyphosphate and water) | 370.74 g |
| Cymel ® 385 | 13.5 g |
| PTSA (10% w/w aqueous solution) | 3.5 ml |
| Synperonic NP10 (10% w/w in water) | 0.5 ml |
| Demineralised Water | 89.0 g |

Example 7

Gas barrier coatings compositions were prepared using mixtures of clays, which were made as described above, except that during preparation of the clay slurry, both types of clay powder were added separately to the de-mineralized water and sheared. Then the montmorillonite slurry was added to the laponite slurry and sheared in the Silverson at high speed for 30 mins.

| | |
|---|---|
| Montmorillonite mineral colloid MO 6% slurry (consisting of 14.8 g mineral colloid MO, 0.74 g sodium tripolyphosphate and water) | 234.0 g |
| laponite RDS (18% w/w slurry in water) | 4.11 g |
| Cymel ® 385 | 13.5 g |
| PTSA (10% w/w aqueous solution) | 3.5 ml |
| Synperonic NP10 (10% w/w in water) | 0.5 ml |
| Demineralised Water | 89.0 g |

Comparative Examples

Example 8

The binder formulation was prepared and sprayed as above without the clay slurry.

| | |
|---|---|
| Cymel ® 385 | 12.2 ml |
| Demineralised Water | 89.0 g |
| Synperonic NP10 (10% w/w aqueous solution) | 0.5 ml |
| PTSA (10% w/w aqueous solution) | 3.5 ml |

Example 9

The coating formulation was prepared as described above except that the montmorillonite was replaced with vermiculite (supplied by W. R. Grace as an 8% w/w aqueous slurry) to which the organic binder solution was added directly with stirring.

| | |
|---|---|
| Cymel ® 385 | 12.2 ml |
| Demineralised Water | 89.0 g |
| PTSA (10% w/w aqueous solution) | 3.5 ml |
| Synperonic NP10 (10% w/w aqueous solution) | 0.5 ml |
| Vermiculite 963 (WR Grace) (8% w/w aqueous slurry) | 200.0 ml |

| Example | Ash wt g per dm2 | O2 permeability of bottle wall cc.mil/100 in$^2$/day/atm | colour b* |
|---|---|---|---|
| PET bottle only | 0.0003 | 5.465 | 4.1 |
| 1 | 0.0231 | 0.196 | 4.55 |
| 1 | 0.0388 | 0.139 | nk |
| 1 | 0.0351 | 0.03 | nk |
| 2 | 0.0238 | 0.559 | 4.41 |
| 3 | 0.0581 | 0.493 | 4.08 |
| 4 | 0.025 | 0.353 | nk |
| 5 | 0.0279 | 0.15 | nk |
| 6 | 0.0175 | 0.279 | 4.6 |
| 7 | 0.0318 | 0.259 | 4.12 |
| 8 | 0.0003 | 4.304 | 4.44 |
| 9 | 0.0294 | 0.272 | 9.88 |
| 9 | 0.0219 | 0.19 | 9.04 |

What is claimed is:
1. A polymeric rigid container for foods and beverages which comprises:
   (a) a polymeric substrate shaped to define a container for a food or a beverage;

(b) a first coating layer adhered to at least one surface of the polymeric substrate for retarding the transmission of oxygen and carbon dioxide through the substrate, said first coating layer comprising an organic binder and from 10% up to less than 90% by weight, based on the dry weight of the first coating layer, of an inorganic laminar mineral selected from montmorillonite, laponite, organo-montmorillonite and mixtures thereof, wherein said laminar mineral comprises platelets which are oriented within the first coating layer in a generally parallel three-dimensional and overlapping spaced relationship, and wherein said organic binder is selected from water-soluble or water dispersible organic resins and mixtures thereof; and (c) a second coating layer adhered to said first coating layer which comprises a curable composition comprising a binder component in an organic solvent; wherein the binder component of the second coating layer is selected from the group consisting of: polyester urethanes and acrylo-urethanes having at least two functional hydroxyl groups; hydroxyl functional linear or branched cycloaliphatic moiety-containing reactive oligomers or a blend of such oligomers; and aliphatic or aromatic isocyanates having at least two functional isocyanate groups where the ratio of isocyanate to hydroxyl functionality is from 0.5 to 3.0, based on equivalents.

2. A polymeric container according to claim 1 wherein the water-soluble or water dispersible organic binder of the first coating layer is selected from the group consisting of:
(a) homopolyesters; copolyesters; copolyesters derived from a sulpho derivative of a carboxylic acid selected from sulphoterephthalic acid and sulphoisophthalic acid;
(b) linear or branched acrylic resins having a weight average molecular weight of at least 3000;
(c) copolymers of acrylic acid, methacrylic acid and their lower alkyl esters;
(d) polyolefins;
(e) polysaccharides and cellulosic materials selected from cellulose, hydroxymethyl cellulose, carboxymethyl cellulose, amylose, pluran, starch, and hydroxyethyl cellulose;
(f) polyvinyl alcohol;
(g) water based aliphatic or aromatic urethanes;
(h) ethylene-vinyl alcohol copolymer (EVOH); polyvinylidene dichloride (PVDC); polyacrylonitrile (PAN); and polyethylenimine wherein said polyethyleneimine polymers are of number average molecular weight of from 3000 to 100,000;
(i) melamine formaldehyde resin;
(j) acrylic latices;
(k) polyvinyl acetate latices;
(l) polyethylene glycol; and
(m) blends thereof;
and said water soluble or water dispersible organic binder optionally contains (1) a catalyst selected from sulfonic acids, amines, and tin catalysts; and (2) at least one cross-linking agent selected from melamine formaldehyde resin, epoxy resins, isocyanates, aziridenes, carbodiimides, urea formaldehydes, phenolics, silanols, and acids.

3. A polymeric container according to claim 2 in which the water-soluble or water-dispersible organic binder is a blend of (i) melamine formaldehyde resin that may optionally include one or more functionalities selected from the group consisting of imino functionality, methylol functionality and alkoxy methyl functionality with (ii) from 5% to 25% by weight, based on the weight of the binder, of an acrylic latex.

4. A polymeric container according to claim 1 in which the polymeric substrate is a polyester selected from polyethylene terephthalate homopolymer or a copolymer of ethylene terephthalate wherein up to about 50 mole percent of the copolymer is prepared from the monomer units of diethylene glycol; propane-1,3-diol; butane-1,4-diol; polytetramethylene glycol; polyethylene glycol; polypropylene glycol and 1,4-hydroxymethylcyclohexane substituted for the glycol moiety in the preparation of the copolymer; or isophthalic, dibenzoic; naphthalene 1,4- or 2,6-dicarboxylic; adipic; sebacic; and decane-1,10-dicarboxylic acid substituted for the acid moiety in the preparation of the copolymer.

5. A polymeric container according to claim 4 in which the polyester substrate is a polyethylene terephthalate homopolymer or a copolymer thereof wherein up to 50 mole percent of the copolymer is optionally prepared from isophthalic acid substituted for the acid moiety; the water soluble or water dispersible organic binder of the first coating layer is melamine formaldehyde resin; the inorganic laminar mineral comprises platelets of montmorillonite; and the second coating layer comprises from 80% to 20% by weight of a binder component which is a blend of a hydroxyl component and an aromatic or aliphatic isocyanate.

6. A polymeric container according to claim 5 wherein greater than 60% of the laminar mineral platelets have an aspect ratio greater than 150.

7. A polymeric container according to claim 6 which is a biaxially oriented PET bottle.

\* \* \* \* \*